United States Patent
Howard et al.

(10) Patent No.: US 6,417,668 B1
(45) Date of Patent: Jul. 9, 2002

(54) VEHICLE BATTERY CONDITION MONITORING SYSTEM

(75) Inventors: Charles E. Howard, Silver Lake; Keith E. West, Andrews; Douglas A. Gremaux, Corunna; James D. Baker, Fort Wayne; H. Edward Kelwaski, Craigville, all of IN (US)

(73) Assignee: International Truck International Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/774,412

(22) Filed: Jan. 31, 2001

(51) Int. Cl.⁷ .................................................. H02J 7/00
(52) U.S. Cl. ..................................................... 324/426
(58) Field of Search ................................ 324/426, 427, 324/428, 429, 430, 431; 320/134, 136

(56) References Cited

U.S. PATENT DOCUMENTS

| | | | |
|---|---|---|---|
| 4,086,524 A | 4/1978 | Kremer | 320/136 |
| 4,598,373 A | 7/1986 | Morishita et al. | 701/1 |
| 4,665,370 A | 5/1987 | Holland | 324/429 |
| 4,968,942 A | 11/1990 | Palanisamy | 324/430 |
| 5,256,959 A * | 10/1993 | Nagano et al. | 320/123 |
| 5,280,231 A | 1/1994 | Kato et al. | 320/155 |
| 5,281,919 A | 1/1994 | Palanisamy | 324/427 |
| 5,412,323 A * | 5/1995 | Kato et al. | 324/429 |
| 5,444,378 A | 8/1995 | Rogers | 324/428 |
| 5,598,088 A | 1/1997 | Richter | 320/134 |
| 5,680,050 A | 10/1997 | Kawai et al. | 324/427 |
| 5,698,962 A | 12/1997 | Sakai et al. | 324/431 |
| 5,744,963 A | 4/1998 | Arai et al. | 324/427 |
| 5,773,962 A | 6/1998 | Nor | 320/134 |
| 5,945,829 A | 8/1999 | Bertness | 320/150 |

\* cited by examiner

Primary Examiner—Edward H. Tso
Assistant Examiner—Pia Tibbits
(74) Attorney, Agent, or Firm—Jeffrey P. Calfa; Neil T. Powell; Dennis Kelly Sullivan (57) ABSTRACT

A method and an apparatus for monitoring a vehicle battery installed on a motor vehicle and indicating the condition of the battery is provided which does not require removal of the battery from the vehicle. Upon initial movement of the ignition key from off to on, open circuit voltage is measured and compared to an allowable range. If open circuit voltage is acceptable, the possibility that polarization is skewing the result is determined, and if the possibility is indicated, a load test is imposed on the engine. Results of testing are maintained as data records to provide updates of the comparison values used for subsequent tests.

29 Claims, 6 Drawing Sheets

TRACTOR TYPE BOX

FIG. 6A

TRUCK TYPE BOX

FIG. 6B

VEHICLE BATTERY CONDITION MONITORING SYSTEM

BACKGROUND OF THE INVENTION

The present invention relates to a system for battery monitoring in motor vehicle applications and more particularly to a battery condition monitoring system for diesel engine equipped vehicles.

DESCRIPTION OF THE PRIOR ART

Lead acid batteries are the conventional source for power used by automatic starters to crank internal combustion engines installed on motor vehicles. Lead acid batteries also provide auxiliary power for other electrical components installed on such vehicles. Failure of a battery to supply power for starting can necessitate jump starting the engine or an expensive and time consuming call to service for assistance. It would be an advantage to operators to receive warning of impending battery failure in time to take corrective action before failure of a battery in the field.

Apparent battery failure can stem from a number of causes. U.S. Pat. No. 5,281,919 to Palanisamy lists a number of possible failure modes relating to start failure of an engine. These include: a low state of charge of the battery; loss of battery capacity (leading to a low state of charge); corroded battery terminals; low electrolyte levels in the cells; a defective charging system; and a defective starting system. Low temperatures magnify these problems by reducing the current supporting capacity of the battery and increasing the power requirements to crank an engine. The most common failure mode for a battery are the progressive increase in the battery's internal resistance and subsequent loss of battery cranking and charge capacity.

Lead acid batteries operate chemically. The chemical reactions that produce current during discharge are not perfectly reversible during recharge. A battery discharges several hundred ampere-seconds during cranking of an engine. Recharging then occurs during the first few minutes after the engine begins running. The cycle of repeated discharge and subsequent recharge of lead acid batteries results in chemical imbalances in and loss of the electrolyte solution, the formation of undesirable compounds on battery plates and physical deterioration of the plates. Lead acid batteries are constructed from closely spaced, alternating plates of sponge lead (Pb), which serve as the negative plates, and lead dioxide ($PbO_2$), which serve as the positive plates. The plates are preferably substantially immersed in a sulfuric acid ($H_2SO_4$) water solution, which serves as an electrolyte. During battery use, lead sulfate ($PbSO_4$) forms on both the negative and positive plates. The concentration of acid in the electrolyte decreases. As the plates become more chemically similar and the acid strength of the electrolyte falls, a battery's voltage will begin to fall. From fully charged to fully discharged each cell loses about 0.2 volts in potential (from about 2.1 volts to 1.9 volts).

Optimally, recharging of a battery reverses the process, strengthening the acid in the electrolyte and restoring the original chemical makeup of the plates. However, recharging can have other effects, including polarization of the battery, overheating and the electrolytic decomposition of the water into molecular hydrogen and oxygen. Occurrence of these factors results in the battery not returning to its original state. Electrolysis of the water reduces the physical volume, and quantity, of the electrolyte. Electrolytic breakdown of the water leaves the electrolyte excessively acidic, with consequential degradation of the battery plates. High temperatures developed during recharging can promote sulfation of the battery plates (i.e. the formation of hardened, relatively insoluble crystalline lead sulfate on the surface of the plates), which in turn increases a battery's internal resistance. To some extent sulfation and other factors resulting in the slow reduction of a lead acid battery's charge capacity can be controlled by avoiding overcharging, or by avoiding overheating of the battery stemming from excessively fast recharging. Polarization results in a poorly mixed electrolyte and a condition where battery voltage reflects a full 2.1 volts per cell, but only because local areas of the electrolyte contain over concentrations of acid, which in turn can damage the plates. As the physical condition of a battery deteriorates, its capacity to hold a charge, in terms of ampere-hours declines. This is the case even though the battery continues to exhibit a 2.1 volt potential per cell when charged to maximum. Accordingly, battery cranking power is not accurately reflected by open circuit potential voltage.

Battery condition is best indicated by the specific gravity of the battery's electrolytic solution. Conventionally, the best way to gauge the state of charge of a lead acid battery has been to measure the specific gravity of the electrolyte of a properly filled (and exercised) battery using a temperature compensated hydrometer. A load test of the battery under controlled conditions may be used, either in conjunction with a check of specific gravity or independently. A load test subjects a fully charged battery to an ampere load equal to ½ the rated cold cranking capacity of the battery (at −18° C.) for 15 seconds, then measures the voltage and the current under load and requires referral to a voltage chart to assess battery condition. See page 48, *Storage Battery Technical Service Manual,* Tenth Edition, published by the Battery Council International, Chicago, Ill. (1987). Such procedures are obviously not easily practiced in the field, where driver/operators of vehicles could make use of a quick indication if a battery has sufficient cranking power to start an engine.

To meet the need for battery condition evaluation in the field, the prior art has proposed numerous battery condition monitoring systems, which rely on other indirect indications of battery condition. In broad overview, a lead-acid battery will exhibit different operating characteristics when new as opposed to when used. As the battery deteriorates it will exhibit a higher internal resistance, and will not accept as great a current input. Voltage under load will fall off more rapidly. Indicators related to these factors may be monitored to give an indication of battery condition. However, difficulties arise from the inability to control the conditions of the evaluation. One such system directed to determining battery condition is U.S. Pat. No. 5,744,963 to Arai et al. Arai et al. teach a battery residual capacity estimation system Residual capacity is estimated from a current integration method which utilizes a voltage-current trend calculating section, sensors for obtaining battery current and terminal voltage, a voltage-current straight line calculating section, and a comparator operation for detecting when residual capacity has declined compared to a prior period residual capacity.

Palanisamy, U.S. Pat. No. 5,281,919, describes a method of monitoring a vehicle battery used with a gasoline engine. Five variables are monitored including ambient temperature (T), battery voltage (V), power source (typically an alternator/voltage regulator) voltage ($V_s$), battery current (I) and time (t). From these variables, the patent provides algorithms for determining the battery's State of Charge (SOC), internal resistance (IR), polarization ($P_R$), and performs various diagnostics.

Palanisamy determines the battery's SOC using a combination of charge integration and open circuit voltage measurements. The open circuit portion of the test relies on a 0.2 voltage drop per cell from a fully charged lead acid cell to a discharged lead acid cell. Open circuit battery voltage (OCV or $V_{OCV}$) may be taken with the engine on, but is measured at point in time which avoids effects of polarization of the battery. Open circuit voltage is deemed to coincide with the absence of current flows into or out of the battery for a minimum period (i.e. I>>0 for a minimum period T). Current integration counts current flow (I) into and out of the battery. Monitoring starts from a point of predetermined charge of the battery, preferably a full charge as determined by the open circuit voltage test. As Palanisamy observes, current integration is subject to error from battery outgassing and deterioration of the physical condition of the battery. The combination of the results is offered as an accurate measurement of the battery's state of charge, but, due to the systematic errors identified in the patent, is not an necessarily an accurate measurement of the battery's condition.

Internal resistance (IR) is estimated from the open circuit voltage, the first measured voltage from the power source and the current flow from the battery following imposition of the starting load. Power output capacity is estimated from IR. Battery polarization arises from non-uniformity of electrolyte density between battery plates and is estimated using $V_s$, $I_s$, the last battery voltage reading during starting. IR can be used to get battery output capacity for a variety at various temperatures, and then used for a comparison to a table of engine start power requirements supplied by the engine manufacturer.

Palanisamy is limited due to the fact that, under common operating conditions, the current required to crank a gasoline engine is substantially less than the load requirements of a standard load test. Cranking of a gasoline engine usually does not generate data of anywhere near the quality of data produced by controlled condition load test making reference to published voltage charts useless as a mechanism for determining battery conditional.

SUMMARY OF THE INVENTION

The invention provides a method and an apparatus for monitoring a vehicle battery installed on a motor vehicle and indicating the condition thereof to a vehicle operator without necessitating removal of the battery from the vehicle. Upon movement of a vehicle ignition switch from off to on, a process of evaluating the vehicle battery is started. The process comprises steps for measuring an open circuit voltage for the vehicle battery and the ambient temperature. The open circuit voltage is compared to a table of allowable open circuit voltage ranges as a function of ambient temperature to determine, as an initial matter, if the open circuit voltage is within acceptable ranges for the battery as indicated by manufacturer's specifications. If the open circuit voltage falls within the acceptable range, it is determined if sufficient time has passed since the most recent execution of the routine to avoid polarization effects on the measured open circuit voltage.

If the possibility of polarization effects on the measured open circuit voltage is indicated by a brief lapse since the vehicle battery was last exercised, a load test is imposed on the vehicle battery by engaging an engine starter system to crank the vehicle engine. If the test is automated a safety interlock may be provided based, for example, on whether the hood is open or closed. After a period T, which is preferably fixed in advance, of cranking the engine, voltage across the terminals of the vehicle battery and current from the vehicle battery are measured, both events occurring while the battery remains under the load imposed by cranking. A specification table indicating battery capacity as a function of the results of the load test, possibly updated by battery history, provides a value indicating battery capacity indicated by the results of the load test. An engine required cranking power specification using engine sensor measurements as inputs provides a value for comparison to the capacity figure. A result of the test provides an input criterion for generating a displayable result.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
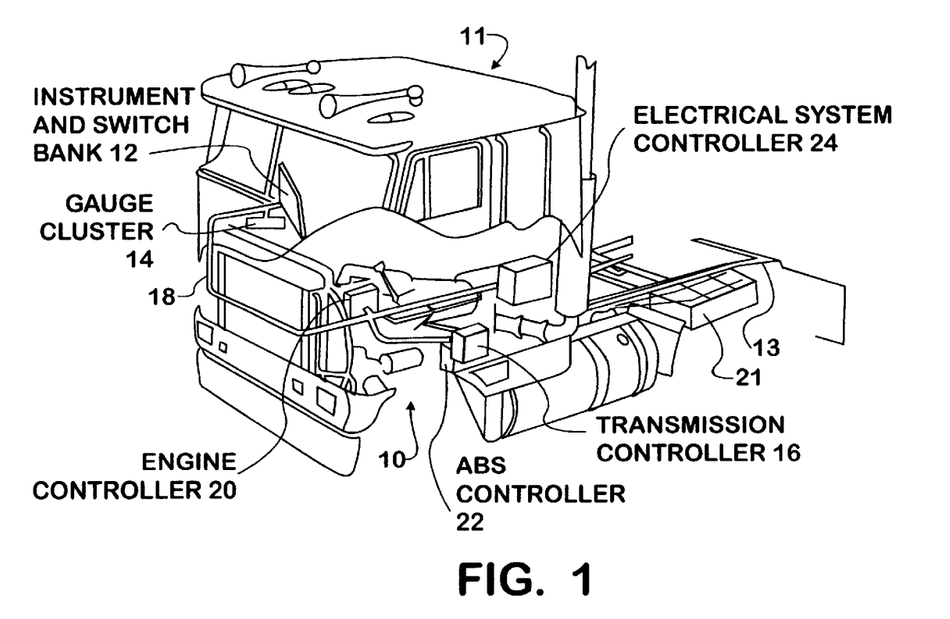
FIG. 1 is a perspective view in partial cutaway of a vehicle truck and an electrical system for the truck.

FIG. 1 is a perspective view of a vehicle 11 and of a vehicle electrical control system 10 installed on the vehicle. Vehicle electrical system 10 comprises a network which may, in one embodiment, comprise a twisted pair (either shielded or unshielded) cable operating as a serial data bus 18. One node of bus 18 is an electrical system controller (ESC) 24, which is a major component of a vehicle electronic control system. ESC 24 manages a number of vocational controllers connected to bus 18 as nodes. ESC 24 also executes a load management program which oversees the total load imposed on the vehicle electrical system and power train by various accessories installed on the vehicle. Collectively, bus 18 and the various nodes attached thereto form a controller area network (CAN).

Active vehicle components are typically controlled by one of a group of autonomous, vocational controllers, which include an instrument and switch bank 12, a gauge cluster 14, an engine controller 20, a transmission controller 16, and an antilock brake system (ABS) controller 22, all of which are connected to ESC 24 over a serial data bus 18 and all of which are connected to bus 18 as nodes. The autonomous controllers include local data processing and programming and are typically supplied by the manufacturer of the controlled component. For each autonomous controller there is a defined set of variables used for communications between the autonomous controller and other data processing components on the network or attached to the network. Gauge cluster 14, transmission controller 16 and engine controller 20 all communicate with ESC 24, which also monitors inputs received from the auxiliary instrument and switch bank 12 over the serial communication link in harness 18. Electronic system controller 24 may be programmed to override the normal response characteristics of the gauge cluster 14, transmission controller 16 and engine controller 20. Bus 18 is preferably a twisted pair cable constructed in accordance with SAE standard J1939.

The loads imposed on vehicle 11 systems and controlled by electrical control system 24 are usually electrical loads, however, they may include electronically controlled engagement of mechanical devices to the power train of vehicle 11. Gear selection in an automatic transmission would be an example of such a system. Other electrically controlled nonelectrical loads can include control of a clutch for an air conditioning compressor, or actuation of pumps driven by the vehicle drive train. The load management program can, depending on power demands by components, request increased power output from the engine through engine controller 20.

Auxiliary power for vehicle 11, particularly used for cranking and starting an engine, is supplied by one or more lead acid batteries 21, shown installed toward the rear of the vehicle from a vehicle siderail 13. Electrical power from batteries 21 may be supplied upon moving a key switch from an off position to an on position, without cranking the vehicle engine. Battery testing in accord with the invention begins upon such movement of the key.

Figure 2:
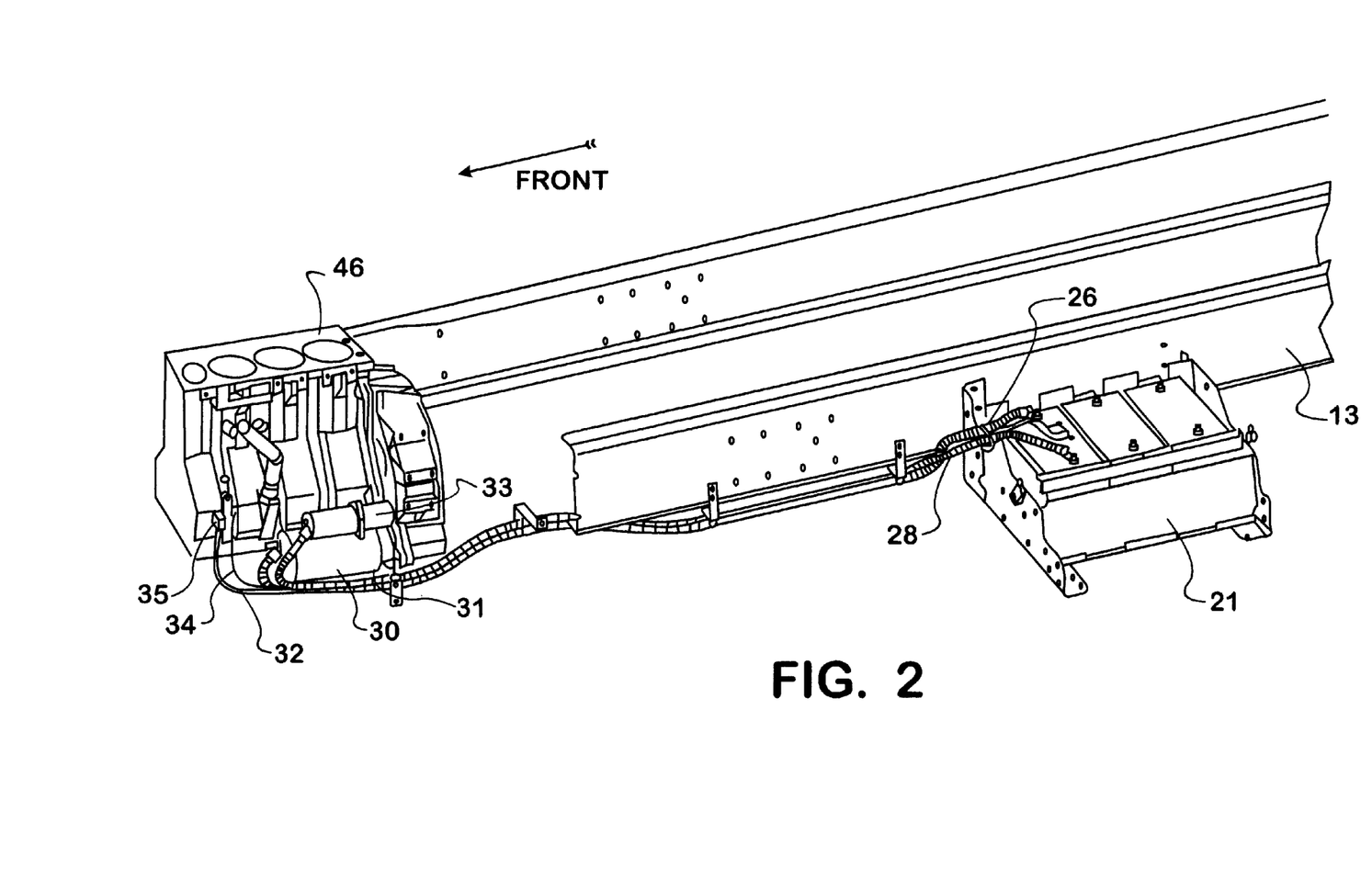
FIG. 2 is a perspective view of a vehicle chassis illustrating a possible mounting position for batteries used for starting an engine and an engine block and starter system.

FIG. 2 illustrates an array of batteries 21 and the manner of connection of the batteries to a starter system 30 for an engine 46 installed on vehicle 11. Batteries 21 are connected in parallel to supply a high amp/hour capacity to vehicle starter system 30 during cranking. A negative terminal battery cable 26 is connected from a negative terminal of one of batteries 21 to a terminal of a starter motor 31, both of which are connected to the vehicle chassis, which serves as a floating ground in a conventional manner. A positive terminal battery cable 28 is connected between a positive terminal from the same one of batteries 21 to an input terminal on a starter system component 33. Terminal cables 26 and 28 are usually 0000AWG cables of known length, and readily determined resistance (usually as a function of temperature). Two instrumentation wires 32 and 34 are also illustrated running from separate terminals on battery 21 to locations adjacent engine 46. Instrumentation wire 34 is connected to chassis ground and wire 32 to a connector box 35.

Figure 3:
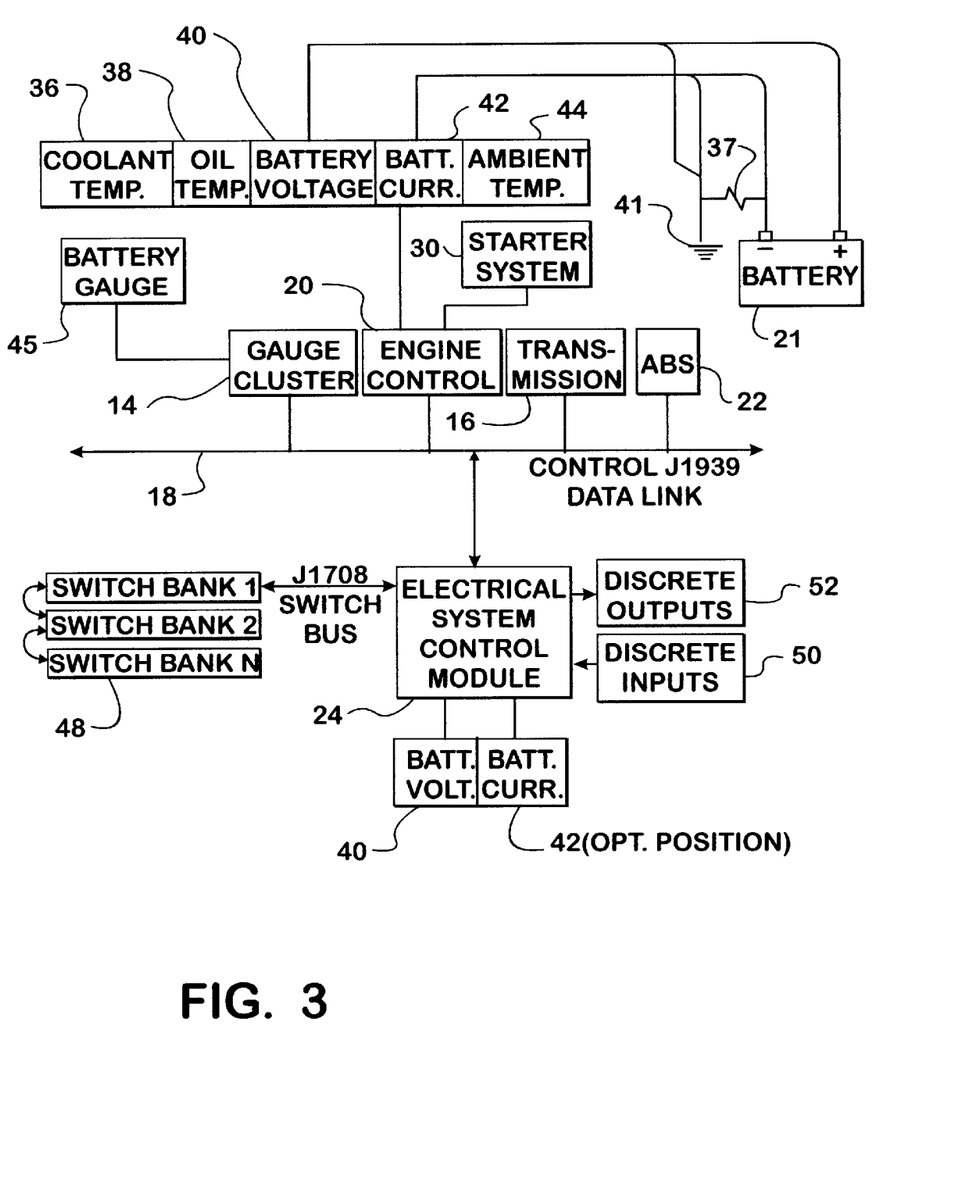
FIG. 3 is a block diagram of a vehicle electronic control network.

FIG. 3 illustrates electronic control of a vehicle 11 schematically, based on a network and an overall electrical system controller 24. As already described, ESC 24 communicateswith several autonomous controllers over a SAE J1939 data link 18, including a gauge cluster 14, a transmission controller 16, an antilock brake system controller 22 and an engine controller 20. Each of these local autonomous controllers may in turn receive data directly from switches and sensors, as ESC 24 does from a switch bank 48 and discrete input section 50. Discrete inputs may include ignition key switch position and start button position. Each local controller may provide control or informational signals to local discretely controllable components, as ESC 24 does with discrete output section 52.

Engine controller 20 is commonly used to monitor a number of operational sensors on a vehicle 11 because of the immediate need of the engine controller for such measurements in controlling fuel flow and air/fuel mixture control to engine 46. Some of these measurements relate to the battery monitoring algorithm of the invention. Engine controller may receive measurements from a coolant temperature sensor 36, an oil temperature sensor 38, a battery voltage sensor 40, a battery current sensor 42 and an ambient temperature sensor 44. Battery voltage sensor 40 and battery current sensor 42 are connected to terminals of a battery 21 to provide electrical output readings relating to battery performance. Alternatively, battery voltage and current sensors 40 and 42 may be connected to ESC 24 or may communicate to ESC 24 over bus 18. Battery voltage measurement requires connection across the negative (or chassis ground 41) and positive terminals of battery 21. Current measurement is made by measurement of the voltage drop along the length of the negative terminal battery cable, the resistance of which is represented by a resistor 37 connected between the negative terminal of battery 21 and chassis ground 41. The resistance of negative terminal cable 26 is a fraction of an ohm and thus a fraction of the internal resistance (IR) of battery 21 and the effect of the battery terminal cable's resistance can be disregarded in measuring of the voltage difference between battery terminals. Ambient temperature from sensor 44 is taken as proxy for battery internal temperature, though those skilled in the art will realize that a direct measurement of battery temperature would be preferred.

The vehicle electrical system includes other components used in practicing the present invention. A gauge cluster controller 14 is used to control the output of a battery gauge 45. As contemplated at the time of filing of this application, it is expected that the battery gauge 45 will be an indication light used to alert a driver/operator of a problem with a battery 21. In some applications battery gauge 45 can be a meter indicating battery capacity as a proportion of maximum capacity for a new battery.

Also under the control of the engine controller is a starter system 30, which is used to crank engine 46 and thus impose a load test on battery 21. Diesel engines commonly used on trucks generally require substantially more cranking and draw a higher current during cranking, than a gasoline fired internal combustion engine. This is due to a lack of a spark source and reliance on compression induced ignition. Compression ignition requires greater compression, imposing a greater load on starter motors than gasoline engines do. Diesel engines have been found by the present inventors to impose enough of a load, for a long enough duration, to allow use for a load test, unlike conditions associated with gasoline engines. With a diesel engine one can be assured of at least 3 to 5 seconds of cranking time before an engine will began to generate power from partial ignition, assuring some constancy of conditions in performing the test. A starting system 30 may be used which forces cranking for a predetermined period once a command to start has been received from a human operator, either by turning an ignition key to the start position or by depression of a start button. Starting system 30 may be automated, however, if it is, a safety interlock is provided keyed on a maintenance profile of the truck.

Figure 4:
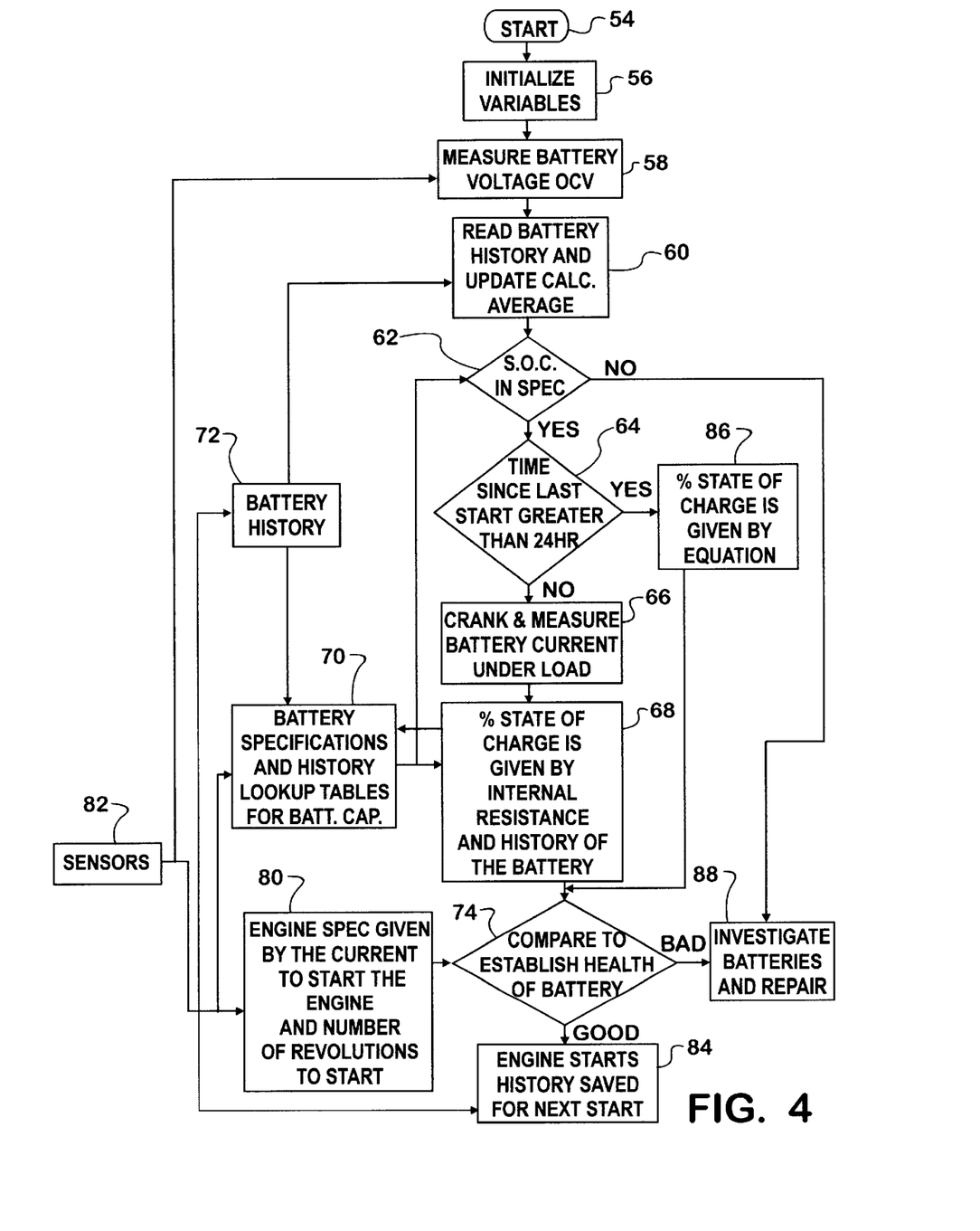
FIG. 4 is a flow chart illustrating the method of the invention.

FIG. 4 is a flow chart illustrating the method of battery evaluation of the invention. The process is executed within ESC 24 and begins upon the ignition key being moved from off to on, but without an attempt to start an engine. A number of variables must be tracked, or kept as records, to fully implement the invention, and accordingly a variable initialization step 56 is the first step executed after start of the process. Start 54 itself initialized one variable, "key", as being equal to 1. A number of variables are defined by the variable initialization step 56. These include: Battery__

Voltage, $V_B$; Battery_Amps, $C_B$, a variable indicating current into and out the battery; Battery_Capacity, $A_B$, the ampere-hours (or minutes or seconds) that the battery is capable of storing, which may be taken as a proxy for battery "health"; Engine_Capacity, $A_E$, the ampere-hours required to crank the engine to a condition of self sustaining ignition; Date_Time, D, which is a time stamp for the test, returned by a clock executing on ESC 24; a Count, N, which indicates the number in sequence of the test being done since maintenance was last done on the battery; and temperature, T, which is usually ambient temperature. Other measurements which effect the power required for engine cranking are not explicitly part of the battery test, but are masked by a look-up table which supplied the figure of estimated amp-hours required to crank the engine. Such tables are supplied by manufacturers of the engine and accordingly we do not need to concern ourselves with how they are used other than as inputs to a look up table. Most variables may be supplied with values immediately, taken from measurements where related to a physical value, or by incrementing a counter as in the case of N. Battery voltage, which eventually requires two measurements, and current measurements require timing however.

Battery Open Circuit Voltage (OCV) is measured at step 58. As is well known, OCV can, absent polarization effects, directly indicate a battery's state of charge (SOC). As is also well known, the capacity of the battery declines with use of the battery and accordingly a full SOC for a new battery reflects substantially more available power than does a full SOC for a degraded battery. This is so even though a six cell lead acid battery will, in either new or degraded condition, exhibit about a 12.6 volt potential when fully charged to its maximum new or its degraded capacity. At step 60, following reading of the OCV, records of previous tests are read and the averages found there are updated. Any major change in the battery's condition can show up here.

Next, at step 62, the measured OCV is compared with a value range retrieved from a set of battery specification and look up tables 70. The individual table used will be determined by the ambient temperature supplied from a collection of sensors 82 (and described above in connection with FIG. 3). If the SOC is in an acceptable range processing advances to step 64. Step 64 is another comparator step which looks at the Date_Time stamp for the current test and the Date_Time stamp for the previous test. If the time differential is small, here 24 hours, the possibility of battery polarization is present. Only if time exceeds some minimum period is a load test done, following the NO branch from step 64.

Step 66 follows along the NO branch from step 64. Step 66 requires that the vehicle starter system 30 be engaged to crank the vehicle engine. The engine is cranked for a minimum period exceeding the required minimum time to start the engine. At some point during cranking, before the minimum period is reached, but after period calculated to substantially drain the battery, battery voltage and battery current are measured. The measurements become inputs in determining the battery capacity in the next step 68. At step 68, initial OCV, voltage after loading and current are used to determine the battery's internal resistance IR, which is then used to look up the battery capacity from table 70. Table 70 comprises values primarily developed from experimental evaluations of batteries under controlled test conditions and accounts for battery age and operational history, which are dynamically obtained from a battery history table 72, which includes the averages and tests results for the battery.

Ideally, the variability of conditions that a driver will encounter are accounted for by providing values in Table 70 to meet likely to encounter circumstances. The table returns a value for Battery_Capacity in ampere hours. Battery_Capacity may also be dynamically updated for current ambient temperature, or better yet, current battery temperature, if such data are available. Battery Capacity may then be compared to Engine_Capacity at step 74 to determine if the battery has a safe margin of capacity for starting the engine. Engine_Capacity is a value determined by a number of variables, engine age, coolant and lubricant temperature and ambient temperature. Engine Capacity_ values are stored in a engine specification table, with the value supplied being determined by exogenous inputs from sensor array 82, which includes a storage register indicating engine age since its build or last rebuild. The values in the table are supplied by the engine manufacturer. If battery capacity is adequate, the record of the test is stored in the history table. Each record will include a N, Date_Time stamp, OCV, SOC and Battery_Capacity. Flags may be set to indicate if Battery_Capacity is valid. If Battery_Capacity is below a threshold relative to engine required power for cranking, no record is recorded. Instead the operator is signaled to obtain battery maintenance at step 88.

Step 62, relating to SOC being within specifications also passes processing to step 88 if the battery charge fails to fall within specifications. Step 64, which aborts a load test if the battery is unlikely to exhibit an SOC reflecting battery polarization, determines battery capacity by execution of an equation using OCV as an input variable. A number of mathematical relationships have been developed equating OCV of an unpolarized battery to battery capacity. Palanisamy, discussed in the background section of this application is one such reference. Most such equations have been linear. Extensive testing of batteries under controlled conditions and least squares evaluation of logarithmic, linear and second and third order polynomial equations in OCV indicate to the present inventors that a second order equation gives more reliable results. Our results are tabulated in Table 1. The column %ah may be taken as the actual figure for battery state of charge.

TABLE 1

| OCV | % ah | ln(ocv) | f(OCV) | f(OCV$^2$) | f(OCV$^3$) |
|---|---|---|---|---|---|
| 12.60 | 100% | 96.92% | 97.32% | 100.14% | 112.74% |
| 12.55 |  | 91.48% | 91.69% | 93.08% | 106.81% |
| 12.50 |  | 86.02% | 86.05% | 86.19% | 100.62% |
| 12.45 |  | 80.54% | 80.41% | 79.46% | 94.25% |
| 12.40 | 75% | 75.04% | 74.78% | 72.90% | 87.73% |
| 12.35 |  | 69.52% | 69.15% | 66.51% | 81.11% |
| 12.30 |  | 63.97% | 63.51% | 60.29% | 74.46% |
| 12.25 |  | 58.40% | 57.87% | 54.23% | 67.82% |
| 12.20 | 50% | 52.81% | 52.24% | 48.34% | 61.25% |
| 12.15 |  | 47.20% | 47.20% | 42.62% | 54.79% |
| 12.10 |  | 41.56% | 41.56% | 37.07% | 48.50% |
| 12.05 |  | 35.90% | 35.90% | 31.68% | 42.42% |
| 12.00 | 25% | 30.22% | 30.22% | 26.46% | 36.64% |
| 11.70 | 0% | −4.40% | −4.11% | −1.33% | 10.57% |

The sum of the absolute values of the errors at 12.6, 12.4, 12.2, 12.0 and 11.7 volts for each regression are as follows: for ln(ocv), 15.55%; for the linear regression, 14.47%, for the second order regression, 6.69%; and the third order equation, 58.93%. The equation obtained by the regression for predicting battery state of charge for an unpolarized battery, uncorrected for temperature is:

$$SOC = 0.3351 OCV^2 - 7.0154 OCV + 36.195$$

which produces a result as a factor of 1.00. While the values for coefficients are the best obtained as of the date of filing, it is not clear that the values will apply to all classes or makes of battery. To obtain percentage figures such as those in the Table 1, the coefficients should be multiplied by 100.

Figure 5:
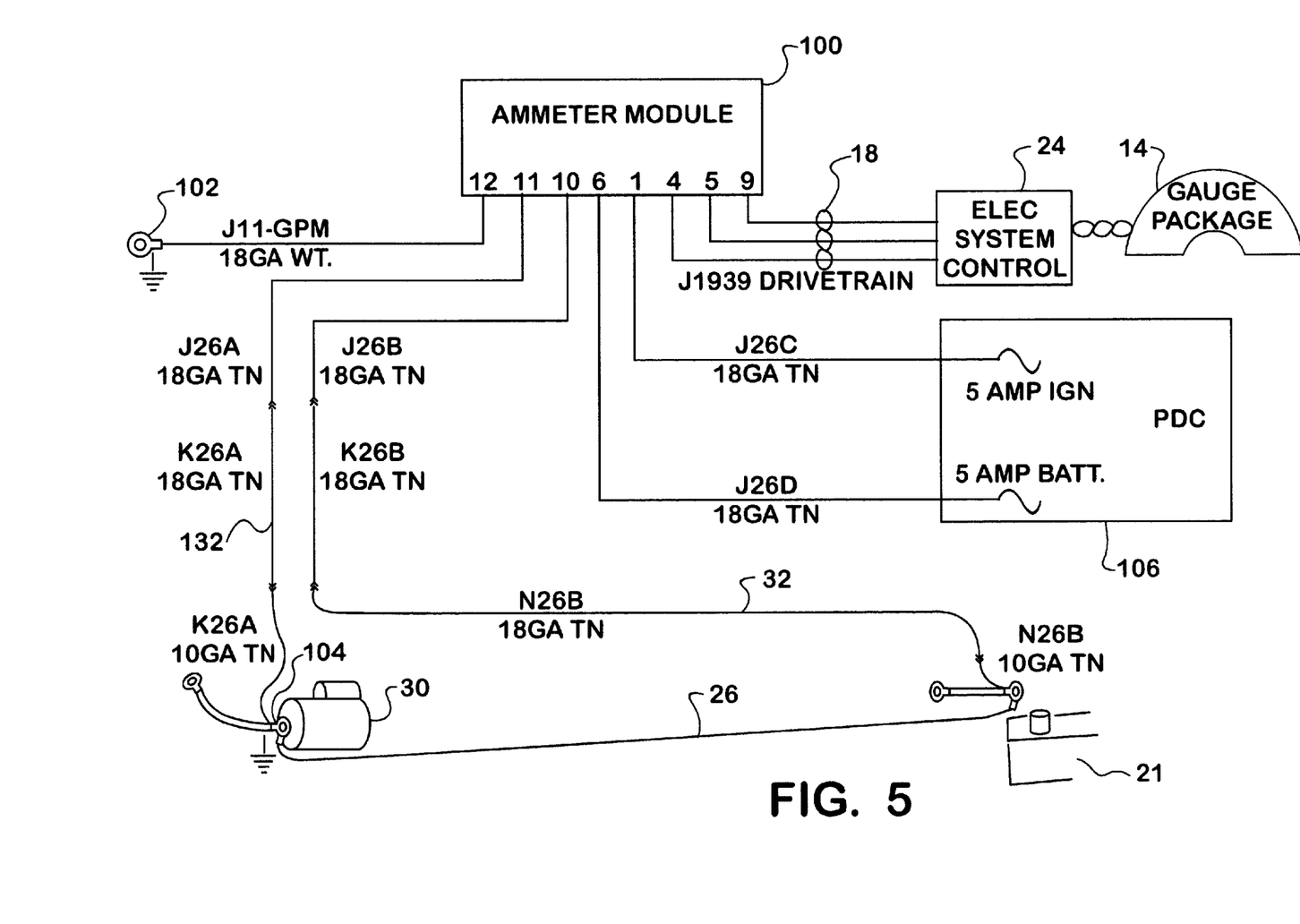
FIG. 5 is a block diagram illustration of a battery current measurement circuit utilized in practicing the invention.

Obtaining inputs for battery evaluation is greatly aided by providing battery current measurement in as reliable and inexpensive manner as practical. FIG. 5 illustrates a battery current measurement circuit directed to this objective. Ammeter module sensor 100 is calibrated to convert a voltage measurement to current by the conventional relationship of current and resistance to voltage. A known resistance is supplied by the battery cable connected between the negative terminal of the battery 21 and chassis ground 104. Ammeter module 100 internal circuitry is grounded by a connection 102 to chassis ground. The voltage drop along negative terminal cable 26 is determined by connection of instrumentation wires 32 and 132 to each end of the terminal cable at chassis ground 104 and at the negative terminal of battery 21. Power is supplied to ammeter 100 for a power distribution center 106. Ammeter 100 is illustrated as communicating with ESC 24 over serial data link 18. Current flow may be displayed by passing the data to gauge controller 14. By using the negative battery terminal 26 as a reference resistance for measuring current flow the need to incorporate a shunt is avoided, reducing costs. In addition, because the voltage measurements are taken across the negative terminal cable, the voltage difference between the instrumentation cables and chassis ground will be small, reducing the possibility of short circuits.

Figure 6A:
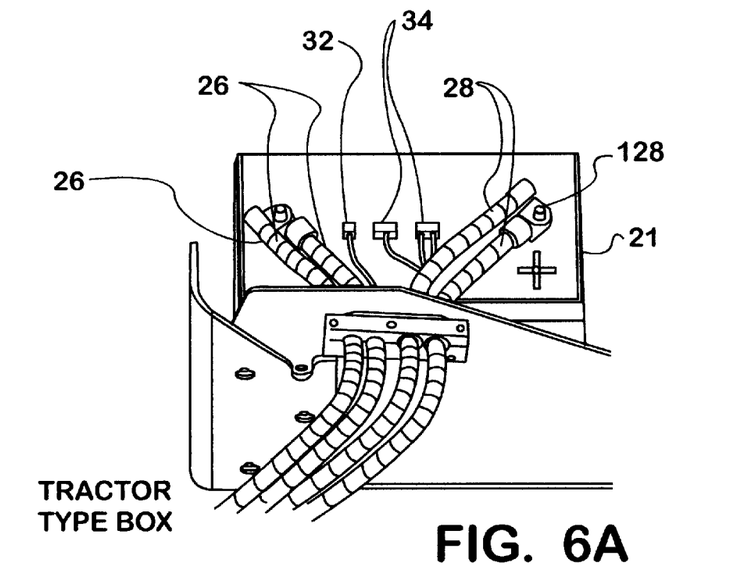
FIGS. 6A–B are perspective views of a battery illustrating connection of an ammeter input to the battery.
Figure 6B:
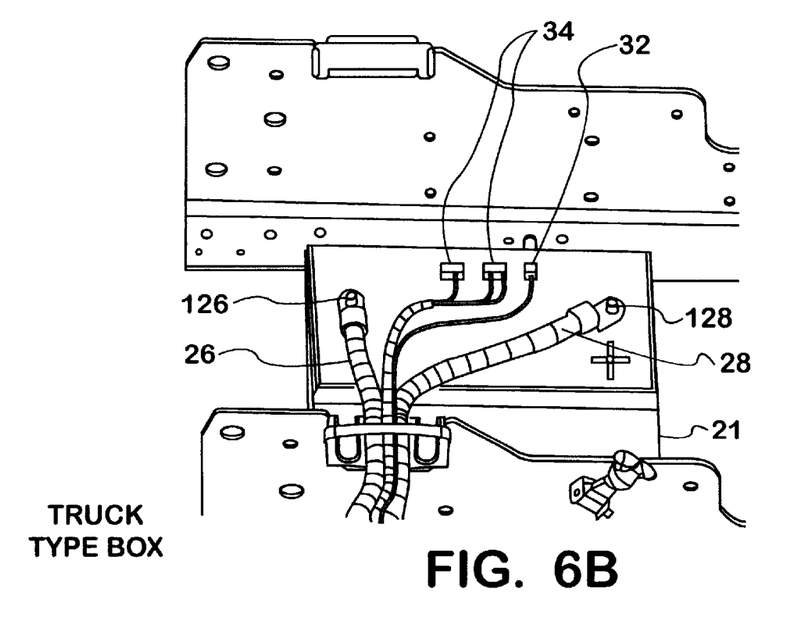

FIGS. 6A–B illustrate connection points for instrumentation wires 32 and 34, used in current and voltage sensing to truck batteries 21. The connections are separated from the main power terminals to avoid corrosion and maintenance problems.

The invention exploits the large power demands for cranking a diesel engine into a field load test regimen for vehicle batteries. Load testing provides a more accurate predictor of battery health than the common methods of exclusively relying on open circuit voltage.

While the invention is shown in only one of its forms, it is not thus limited but is susceptible to various changes and modifications without departing from the spirit and scope of the invention.

What is claimed is:

1. Apparatus for monitoring a battery having negative and positive terminals, comprising:
   a current sensor connected to a terminal of the battery for measuring current passing into and out of the battery;
   a voltmeter connected across the terminals of the battery for measuring battery voltage;
   a temperature sensor located near the battery for providing readings of ambient temperature;
   a data processing system receiving data from the current sensor, the voltmeter and the temperature sensor and including memory for the storage of programs and data;
   an engine starter system coupled for energization by the battery;
   a battery history table including records of battery condition during prior starts of the apparatus;
   an engine cranking power specification table: stored in the memory for providing an estimate of cranking power required to start an engine;
   a battery capacity table stored in the memory for providing estimates of battery capacity as a function of battery history, ambient temperature, open circuit voltage of the battery, voltage after a period T of cranking and current discharge during cranking; and
   a comparator utilizing the estimate of cranking power and an estimate of battery capacity as inputs to determine if battery capacity exceeds the cranking power estimate.

2. Apparatus as claimed in claim 1, further comprising:
   means for measuring the time lapse since an immediately prior start of the apparatus;
   means responsive to the measurement of the time lapse for providing a battery capacity estimate as a function of open circuit voltage when the measured time lapse exceeds a minimum period; and
   means responsive to the measurement of the time lapse falling below the minimum for indicating need for engaging the engine starter system to provide a load test of the battery.

3. Apparatus as claimed in claim 2, wherein the minimum period is long enough to exceed the period required for substantially all polarization effects in the batter to dissipate.

4. Apparatus as claimed in claim 3, further comprising:
   means responsive to a determination of the comparator that battery capacity exceeds the engine cranking requirement for recording a time and date stamped record in the battery history and further responsive to the opposite determination to indicate a need for maintenance of the battery.

5. Apparatus as claimed in claim 4, wherein the means for providing a battery capacity estimate as a function of open circuit voltage utilizes the measurement of open circuit voltage as a value in a second order polynomial equation of the form $$Y=Ax^2+Bx+C$$

where x is open circuit voltage.

6. Apparatus as claimed in claim 5, wherein A>>0.3351, B>>−7.0154 and C>>36.195.

7. Apparatus as claimed in claim 2, and further comprising the current sensor being connected to the negative terminal of the vehicle battery to detect current into and out of the battery undergoing testing.

8. A method of monitoring a vehicle battery installed on a motor vehicle, the method comprising the steps of:
   (a) measuring an open circuit voltage for the vehicle battery and the ambient temperature;
   (b) providing a table of allowable open circuit voltage ranges as a function of ambient temperature;
   (c) comparing the open circuit voltage to an allowable open circuit voltage range for the ambient temperature;
   (d) responsive to the open circuit voltage falling within the allowable open circuit voltage range, determining if sufficient time has passed since the most recent execution of the routine to avoid polarization effects on the measured open circuit voltage;
   (e) responsive to time since the last start indicating possible polarization effects on the measured open circuit voltage of the vehicle battery, imposing a load on the vehicle battery by engaging an engine starter system;
   (f) a period T after the engine starter system has been engaged, measuring voltage across the terminals of the vehicle battery and current from the vehicle battery under the load;
   (g) providing a specification table indicating battery capacity as a function of the results of the load test;
   (h) applying the results of the load test to the battery specification table to obtain a capacity figure for the vehicle battery;

(i) providing an engine required cranking power specification using engine sensor measurements as inputs; and (j) comparing the capacity figure for the vehicle battery to an engine required cranking power figure obtained from the engine required cranking power specification and indicating the result of the comparison.

9. A method as set forth in claim 8, and further comprising saving a record of the results of the battery test in a battery history table responsive to the result of the step (j) indicating battery capacity exceeds the engine required cranking power figure.

10. A method as set forth in claim 9, wherein battery current for the load test is measured from the voltage drop across a ground wire from the negative terminal of the battery to chassis ground.

11. A method as set forth in claim 8, wherein responsive to the open circuit voltage falling outside the allowable open circuit voltage range in step (c), aborting the method and indicating need for battery maintenance.

12. A method as set forth in claim 11, wherein responsive to a counter indication of possible polarization in the vehicle battery, determining a proportion of battery state of charge by solution of a second order polynomial equation of the form $$Y=Ax^2+Bx+C$$

where x is open circuit voltage.

13. A method as set forth in claim 12, wherein A>>0.3351, B>>−7.0154 and C>>36.195.

14. A method as set forth in claim 12 further comprising, responsive to solution of the polynomial equation to obtain a proportion of the battery state of charge, substituting that result for the results of a load test in executing step (i).

15. A method as set forth in claim 14, further comprising saving a record of the results of the battery test in a battery history table responsive to the result of the step (j) indicating battery capacity exceeds the engine required cranking power figure.

16. A method as set forth in claim 15, wherein the battery history table includes a record for each start and successful test of the vehicle battery, with the records being ordered and each record including the measured open circuit voltage and a state of charge metric.

17. A method as set forth in claim 16, wherein the battery specification table for battery capacity includes battery ratings at ambient temperature correlated with records in the battery history table.

18. A method as set forth in claim 17, where the engine required cranking power specification is addressed using measurements for ambient temperature, coolant temperature and engine lubricant temperature as well as engine history.

19. Apparatus for monitoring a vehicle battery installed on a motor vehicle, comprising:

a voltage sensor providing for measuring voltage across the terminals of the vehicle battery;

an ambient temperature sensor;

a battery current sensor;

a data processing system including memory;

a table of allowable open circuit voltage ranges as a function of ambient temperature stored in memory;

a first comparator executable on the data processing system taking an open circuit voltage provided by the voltage sensor as an input and an entry from the table of allowable open circuit voltage ranges as another input to determine if the open circuit voltage falls within the allowable open circuit voltage range;

a timer, responsive to the open circuit voltage falling within the allowable open circuit voltage range, for determining if sufficient time has passed since the most recent execution of the routine to avoid polarization effects on the measured open circuit voltage;

load test initiating means responsive to insufficient time having passed since the last start, for imposing a load on the vehicle battery by engaging an engine starter system;

sampling means response to passage of a period T after the engine starter system has been engaged, for taking a voltage measurement from the voltage sensor and a current measurement from the battery current sensor;

a specification table indicating battery capacity as a function of the results of a load test;

an engine required cranking power specification using at least ambient temperature as an input; and a second comparator taking the a capacity figure for the vehicle battery and an engine required cranking power figure obtained from the engine required cranking power specification as inputs and indicating a result for the comparison.

20. Apparatus as claimed in claim 19, further comprising a battery history table including records of the results of each battery test for which the capacity of the vehicle battery exceeded the engine required cranking power figure.

21. Apparatus as claimed in claim 20, further comprising a comparator for taking the open circuit voltage and the allowable open circuit voltage range as inputs and for indicating a need for battery maintenance if the open circuit voltage falls outside the allowable range.

22. Apparatus as claimed in claim 20, wherein battery current sensor is connected to the negative terminal of the battery and to the chassis ground for obtaining a voltage drop across a battery ground wire and determining current from that measurement.

23. Apparatus as claimed in claim 21, further comprising a mathematical function execution block stored in memory responsive to the timer giving a counter indication of possible polarization in the vehicle battery, for determining a proportion of battery state of charge by solution of a second order polynomial equation of the form $$Y=Ax^2+Bx+C$$

where x is open circuit voltage.

24. Apparatus as claimed in claim 23, wherein A>>0.3351, B>>−7.0154 and C>>36.195.

25. Apparatus as claimed in claim 23 further comprising, means for substituting a solution of the second order polynomial equation as an input to the second comparator for the results of a load test.

26. Apparatus as claimed in claim 25 further comprising, means for saving a record of the results of the battery test in a battery history table responsive to the each start where battery capacity is indicated as exceeding the engine required cranking power figure by the second comparator.

27. Apparatus as claimed in claim 26, wherein the battery history table includes a record for each start and successful test of the vehicle battery, with the records being ordered and each record including the measured open circuit voltage and a state of charge metric.

28. Apparatus as claimed in claim 27, wherein the battery specification table for battery capacity includes battery ratings at ambient temperature correlated with records in the battery history table.

29. Apparatus as claimed in claim 28, further comprising sensors for engine coolant temperature, engine lubricant and a timer tracking time of operation for the engine, and wherein the engine required cranking power specification is addressed using measurements for ambient temperature, coolant temperature and engine lubricant temperature as well as engine time of operation.

* * * * *